US005457866A

United States Patent [19]

Noda

[11] Patent Number: 5,457,866

[45] Date of Patent: Oct. 17, 1995

[54] BOLT-TIGHTENING METHOD USING AN IMPACT WRENCH

[75] Inventor: Hirotoshi Noda, Atsugi, Japan

[73] Assignee: Kabushiki Kaisha Yamazaki Haguruma Seisakusho, Kanagawa, Japan

[21] Appl. No.: 206,694

[22] Filed: Mar. 7, 1994

[30] Foreign Application Priority Data

Apr. 21, 1993 [JP] Japan .................................... 5-117712

[51] Int. Cl.$^{6}$ .................................................... B23Q 17/00

[52] U.S. Cl. ................................ 29/407; 29/456; 29/714; 173/183; 81/429; 81/469; 73/862.23

[58] Field of Search ............................. 29/407, 456, 240, 29/705, 707, 714; 81/463, 464, 465, 466, 429, 467, 469; 173/6, 11, 176, 183; 73/862.21, 862.23

[56] References Cited

U.S. PATENT DOCUMENTS

| | | | |
|---|---|---|---|
| 3,205,925 | 9/1965 | Wiley | 81/429 |
| 3,780,603 | 12/1973 | Whitaker | 173/183 |
| 4,609,089 | 9/1986 | Kobayashi et al. | 173/183 |
| 4,619,162 | 10/1986 | Van Laere | 81/464 |

FOREIGN PATENT DOCUMENTS

| | | |
|---|---|---|
| 50763 | 7/1994 | Japan . |
| 206172 | 7/1994 | Japan . |

*Primary Examiner*—David P. Bryant
*Attorney, Agent, or Firm*—Keck, Mahin & Cate

[57] ABSTRACT

The present invention provides an impact wrench and a bolt-tightening method such that a spring force is applied, through the circumference of a spindle coupled with the output shaft of an electric motor, in the forward direction to a hammer which is capable of forward and rearward movement and rotational motion following the spindle. The hammer and an impact shaft are brought in coaxial mesh alignment by leaving a gap between them in the direction of rotation so that when a bolt to be tightened is inserted into a socket fixed to an end of the impact shaft to permit the bolt to be tightened, the mesh contact with the impact shaft is released as a result of the hammer being lifted up in the rearward direction against the reaction force due to the tightening of the bolt. An impact sensor detects release of the hammer from the impact shaft and an angle sensor measures the angle of rotation of the impact shaft. This permits measurement of the torque of the impact shaft by measuring the amount by which the angle of rotation of the impact shaft advances each time the impact force is generated. The amount by which the angle of rotation of the impact shaft advances from the time at which the measured torque has reached the previously set snug torque value can also be measured so that the power supply to the electric motor is disconnected when the amount of advancement of the rotational angle has reached a pre-defined value of the preset angle of rotation to stop the rotation of the impact shaft through a braking circuit.

1 Claim, 9 Drawing Sheets

FIG. 6(a) FIG. 6(b) FIG. 6(c)
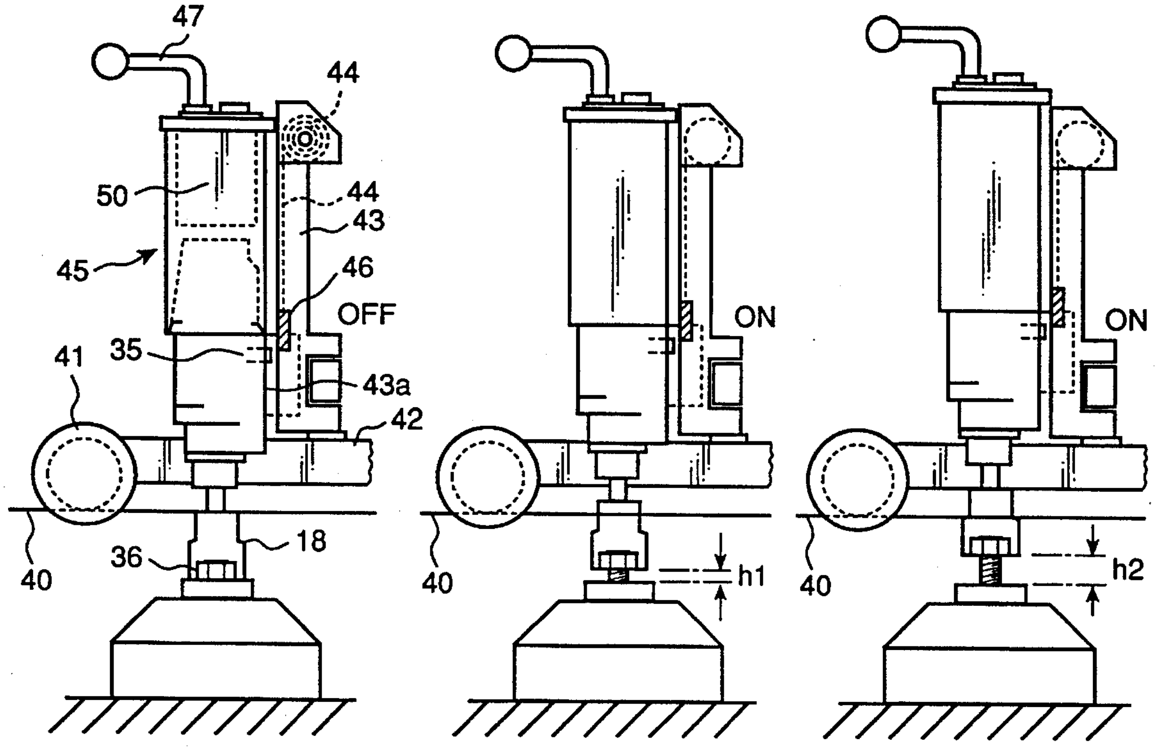
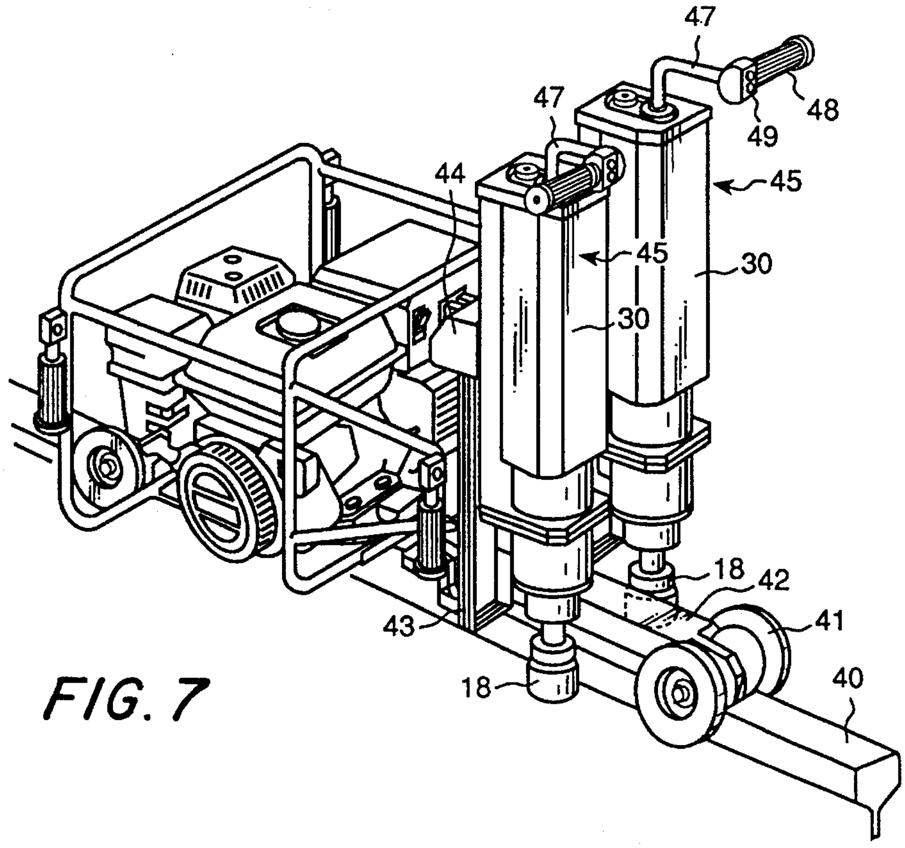
FIG. 7

BOLT-TIGHTENING METHOD USING AN IMPACT WRENCH

BACKGROUND OF THE INVENTION

1. Field of the Invention

This invention relates to an impact wrench for the tightening of bolts using track rail by means of a plate-shaped tightening spring and to a method for tightening bolts using an impact wrench designed so that bolt tightening is achieved with the required spring compression force by measuring the angle of rotation of the impact shaft from the time at which the pre-set snug torque is being generated.

2. Description of the Prior Art

Track rails are secured by tightening bolts on to wooden and PC crossties by means of a plate-shaped tightening spring to hold down the rail. To tighten these bolts, a significant level of skill had been necessary as the application of the required tightening torque for tightening the bolts with the familiar impact wrench by means of the prescribed spring compression force had to be left to the judgment and feeling of the operator.

To achieve automatic control of the conventional type of impact wrench, the inventor has achieved further progress with the invention of an impact wrench using the rotating angle method in such a manner the angle of rotation of the impact wrench is measured and the electric motor is stopped when the predetermined angle of rotation has been reached. (Japanese Utility Model Registration Application No. 4430/1992).

The familiar impact wrench is designed so that a hammer is coaxially meshed with the impact shaft to rotate the bolt-tightening socket, with a force being applied to said hammer by means of a spring in the direction of the impact shaft. When bolts are tightened, the hammer rotates under the drive force of the electric motor and said impact shaft rotates while the hammer and the impact shaft are in mesh. When the bolt-tightening reaction force has become larger than the spring force applied to the hammer, however, the hammer will be lifted and separated from the impact shaft to permit its free rotation. Immediately after this, the hammer is again subjected to the spring's compression force to come into mesh with the impact shaft. As this mesh contact is obtained, a knocking force is applied to the impact shaft while the hammer is rotating so as to tighten the bolts.

The impact wrench thus requires a specific timing at which the measurement of the angle of rotation is commenced in order to ensure that the bolts are tightened by the fixed angle of rotation previously set by the rotational angle method.

The impact wrench based on the rotational angle method disclosed in Japanese Utility Model Registration Application No. 4430/1992, however, had been designed so that the timing for the release of the hammer from the impact shaft was specified in terms of the time at which the snug torque is generated so that the motor was stopped when the angle of rotation measured thereafter reached the predetermined amount of bolt-tightening.

In practical bolt-tightening operation, however, it happens that the bottom of the rail is lifted up without making contact with the crosstie (floating crosstie) before the bolt is tightened. The problem in such cases was that the possibility existed that the motor might be stopped before the correct bolt-tightening condition was achieved since, for the tightening of bolts by the above rotational angle method, the compression force for bringing the rail into contact with the PC crosstie was used as the reaction force acting in the upward direction so that the measurement of the angle of rotation would commence before the correct snug torque was detected.

In view of these earlier problems, according to the present invention a bolt-tightening method which is a combination of a torque method with the rotational angle method for automatic impact wrench control has been adopted. (Japanese Patent Application No. 19650/1993).

In this bolt-tightening method, the angle of rotation of the impact shaft and the torque are measured from the time at which the snug torque is generated so as to ensure that the electric motor will stop when both the impact shaft's angle of rotation and the torque have reached the prescribed values.

This type of bolt-tightening method is thus capable of resolving and overcoming the problem associated with the rotational angle method and the problem inherent in the torque method, that is, the problem of the electric motor's stopping before the tightening of the bolt is completed in the floating crosstie condition and the problem of variations in the tightening force applied to the bolt due to the influence of the conditions of the screw surface.

With this combined bolt-tightening method, however, the time at which the snug torque is generated was specified as the time at which the hammer is released from the impact shaft and impact is generated. As a result, a difference occurred in the time of completion of bolt-tightening by the rotational angle method and that by the torque method, thereby giving rise to the problem of errors arising in either of these methods.

SUMMARY OF THE INVENTION

The purpose of present invention, resulting from the above considerations, is to provide a bolt-tightening method using an impact wrench in such a manner as to resolve the conventional problems associated with defining the time of snug torque generation and ensure that the correct bolt-tightening conditions are automatically achieved regardless of the environmental conditions in which bolt-tightening takes place.

To overcome the above problems, the impact wrench bolt-tightening method according to this invention is characterized in that the impact wrench bolt-tightening method is designed so that a spring force is applied, through the circumference of a spindle 6 coupled with the output shaft 3 of an electric motor 2, in the forward direction to a hammer 8 which is capable of forward and rearward movement and rotational motion following said spindle 6. The hammer 8 and impact shaft 9 are brought in coaxial mesh alignment by leaving a gap between them in the direction of rotation so that when the bolt 36 to be tightened is inserted into socket 18 fixed to the front end of said impact shaft 9 to permit the bolt to be tightened, the mesh contact with said impact shaft 9 is released as a result of said hammer 8 being lifted up in the rearward direction against the reaction force due to the tightening of said tightened bolt 36. As said hammer 8 is again brought into mesh contact with impact shaft 9 under the spring force applied in the forward direction, an impact force is generated with respect to the direction of rotation of said impact shaft 9. An impact sensor 31, detecting the release of said hammer 8 from said impact shaft 9, and an angle sensor 32, measuring the angle of rotation of said impact shaft 9, are provided, so as to measure the torque of said impact shaft 9 by measuring the amount by which the angle of rotation of said impact shaft 9 advances each time said impact force is generated and to measure the amount by which the angle of rotation of said impact shaft 9 advances from the time at which said measured torque has reached the previously set snug torque value. The power supply to said electric motor 2 is disconnected when the amount of advancement of the rotational angle has reached the predefined value of the preset angle of rotation to stop the rotation of said impact shaft 9 through the braking circuit.

BRIEF DESCRIPTION OF THE DRAWINGS

FIGS. 6(*a*) to (*c*) are explanatory drawings showing the bolt-slackening action using the impact wrench according to this Invention.

FIG. 7 shows an impact wrench-mounted bolt-tightening machine with two built-in impact wrenches mounted on the left and right, respectively, in accordance with this Invention.

DESCRIPTION OF THE PREFERRED EMBODIMENTS

This invention is characterized in that the timing for the generation of the snug torque is not taken as the time of impact generation varying as a result of different factors as has been the case in the past. This invention is also characterized in that the tightening reaction force of each bolt being tightened is detected after impact has been generated by measuring the angle of rotation advancing with each impact, that is, by measuring the amount of advancement of the rotational angle associated with any one impact, in such a manner that the time at which the amount of angular advancement has reached a preset snug torque (the predetermined snug torque value) is taken as the origin for beginning to measure the angle of rotation of the impact shaft. The electric motor stops when this rotational angle has reached a predetermined value (the set rotational angle value).

In this bolt-tightening method, the predetermined snug torque value is variable so that it can be set in accordance with the bolt-tightening environment.

Figure 1A:
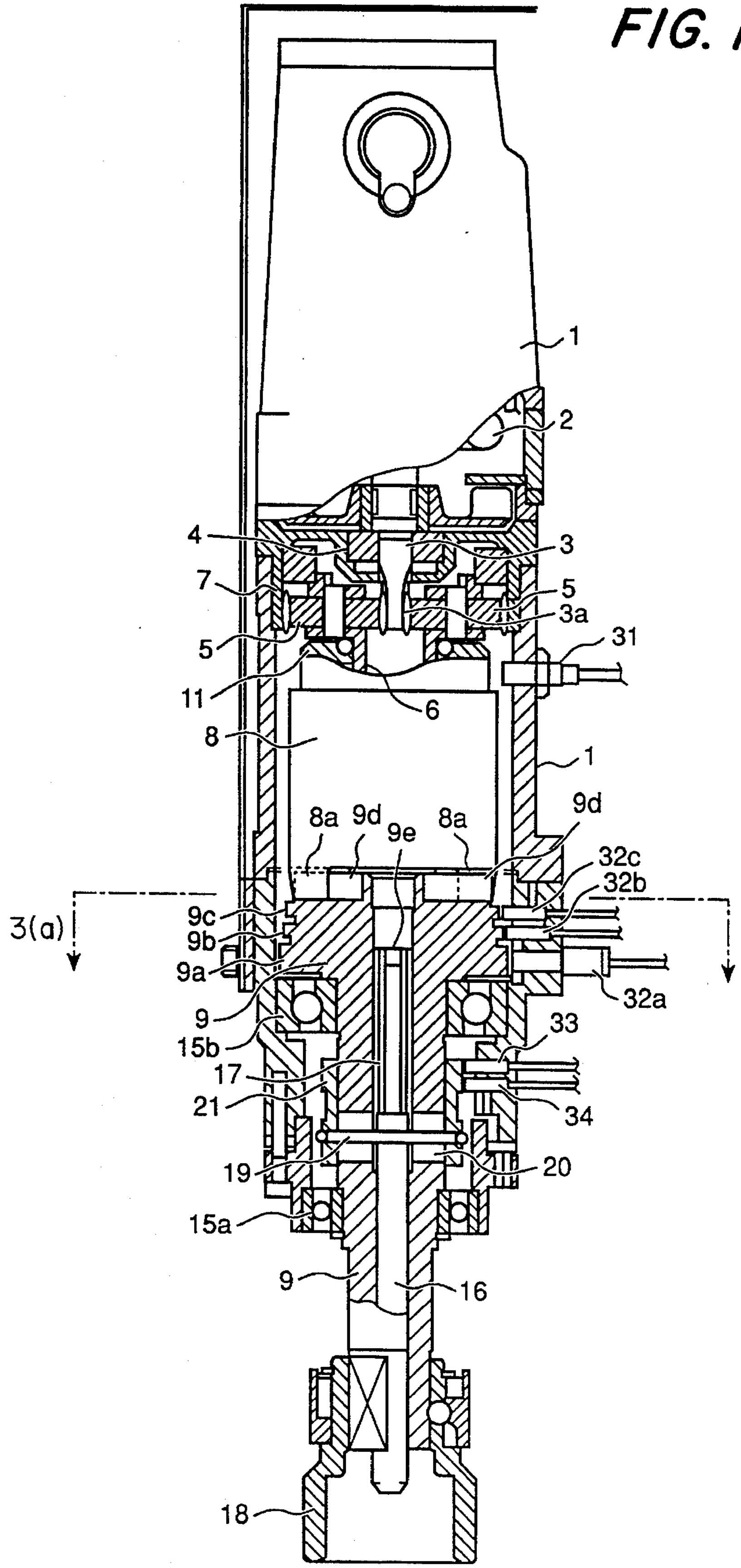
FIG. 1(*a*) is a cross-section drawing of the impact wrench according to this invention and FIG. 1(*b*) is a partial cross-section drawing of the nut socket capable of being installed to replace the bolt socket of the impact wrench shown in FIG. 1(*a*).
Figure 1B:
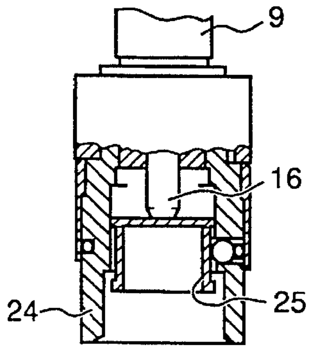
Figure 11:
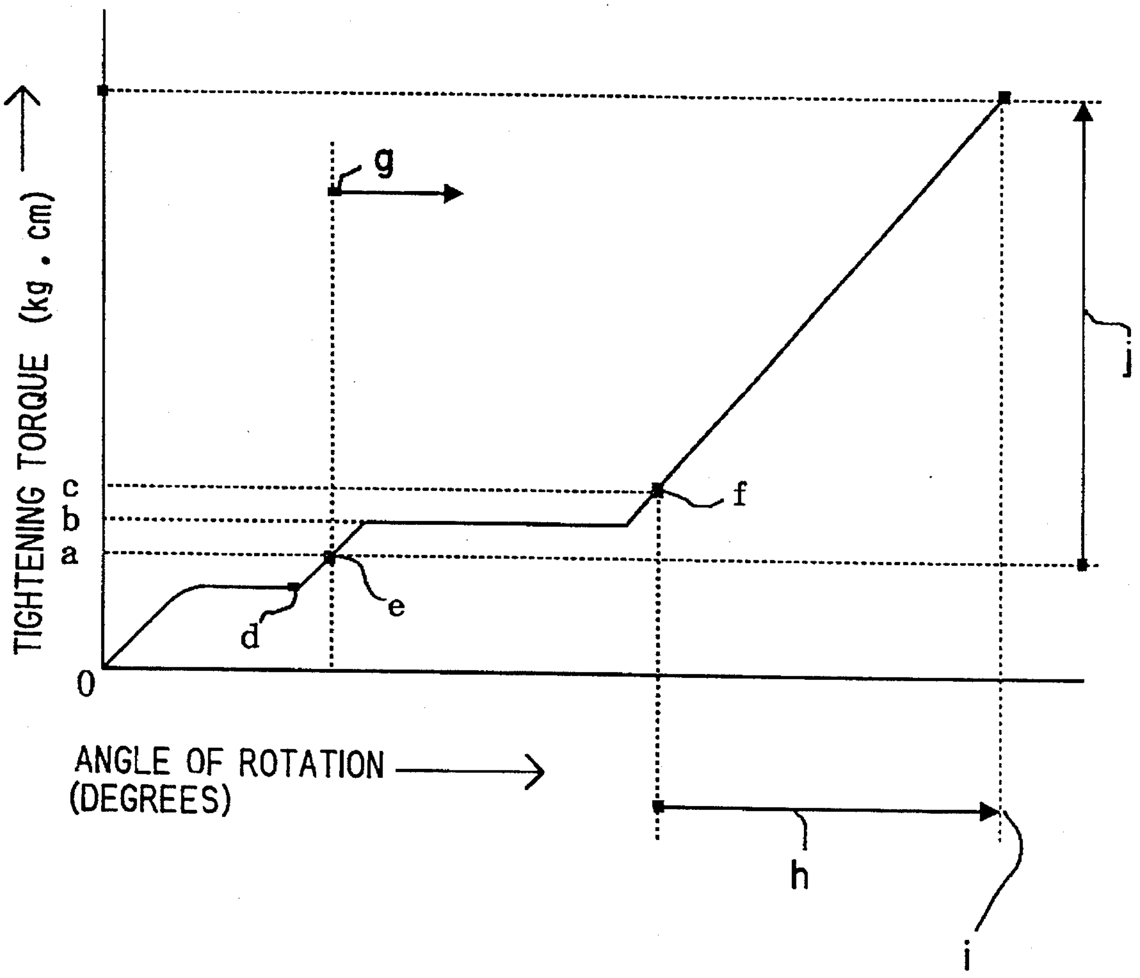
FIG. 11 shows the relationship between the tightening torque and the rotational angle for the floating crosstie associated with the impact wrench according to this invention.

FIG. 11 is used here to explain the operation using the impact wrench shown in FIG. 1 for tightening floating crosstie bolts.

FIG. 11 shows that the torque a for generating the impact is smaller than the torque for lifting the floating crosstie (lift-up torque b). The predetermined snug torque value c is set to a value larger than this lift-up torque b.

When the bolt socket 18 mounted on to the impact shaft 9 is seated into the bolt head and the electric motor 2 is started, the bolt head will correctly mesh with the socket 18 when the shape sensor 34 has switched on (d) so that a fit is detected on the plate spring.

When the hammer 8 lifts from the impact shaft 9 and the impact sensor 31 switches ON (e), an impact is generated, which impact is taken as the starting point g (origin) for measuring, with angle sensor 32, the amount of advancement of the rotational angle with each impact. Since this impact is generated as a result of the impact created as the plate spring's compression reaction force; it follows that this is the time at which the plate spring begins to compress.

In the case of floating crossties, the crosstie will still remain separated from the rail even when such an impact is generated so that the lift-up torque b will remain practically unchanged until the crosstie makes contact with the rail. This is the case irrespective of the advancement of the rotational angle. When the crosstie does make contact with the rail, the plate spring used for holding down the rail will begin to be compressed so that the torque will increase.

At the time f, at which the amount of advancement of the rotational angle with each impact as measured with angle sensor 32 has reached the predetermined snug torque value, the magnitude of the rotational angle h required for tightening the bolt is measured with angle sensor 32 in terms of the absolute value of the rotational angle of the impact shaft 9 and the rotation of the impact shaft 9 will be completed when this value has reached the predetermined rotational angle value i.

Practical Examples

The following is a description of practical examples of the present invention are used to explain this invention, making reference to attached drawings.

The impact wrench shown in FIG. 1(*a*) has an electric motor 2 installed in case 1, and the circumference of its output shaft 3 is supported in bearing 4. At the front end of the output shaft 3 of the electric motor 2, there is a gear 3*a* on its circumference, and the two idling gears 5 and 5 meshing with said gear 3*a* are supported in symmetrical positions at the rear end of spindle 6. The circumferential gear portions of the two idling gears 5 and 5 are in mesh with the internal gear portion of the ring gear 7 which is mounted in case 1.

This arrangement is designed so that when the output shaft 3 of the electric motor 2 rotates, the idling gears 5 and 5 on both sides will rotate, being guided by ring gear 7, with the result that spindle 6 will slow down in its rotational movement.

Figure 2A:
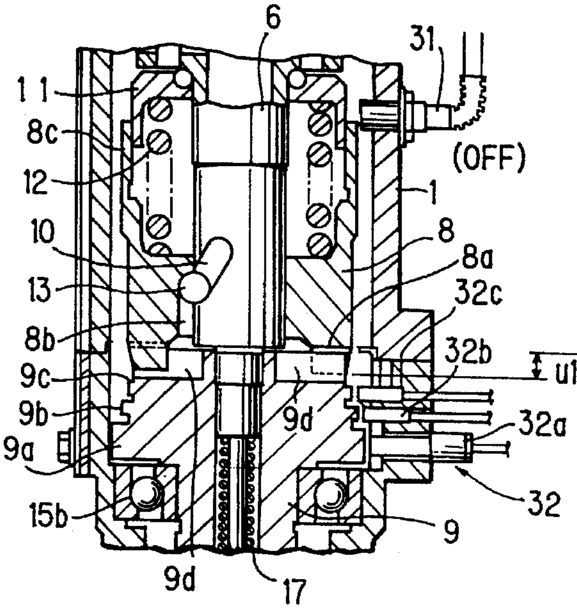
FIGS. 2(*a*) and (*b*) form a partial cross-section drawing of the impact-generating part of the impact wrench according to this invention.
Figure 2B:
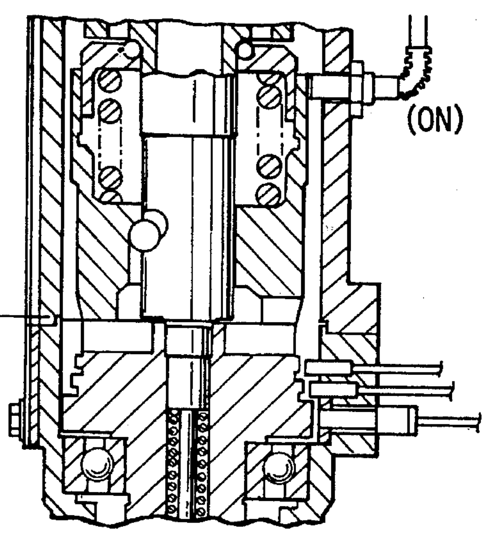

As shown in FIG. 2, the interior of the hammer 8 has a cup-shaped spring sheet 11 inserted at the rear end of spindle 6 while the hammer 8 has a freely sliding fit on the circumference of the front part of spindle 6. The rear portion of the hammer 8 forms an outer cylinder **8*c* and the interior of this outer cylinder 8*c* is provided with a free-sliding fit on the circumference of the spring sheet 11. Between the spring sheet 11 and hammer 8, a spring 12 is provided in a coaxial arrangement with spindle 6 in such a manner that said hammer 8 is forced into the forward direction (in the direction of socket 18) with respect to spring sheet 11**.

Furthermore, the circumference of said spindle 6 is provided with at least one threaded groove 10 of limited length. A ball 13 is provided in each of the threaded grooves 10 so that its circumference is in sliding contact with the hollow part **8*b* of the front portion of hammer 8. As a result, said hammer 8 is forced forward under the spring force of spring 12 while each of the balls 13 is capable of reciprocal movement within the range in which it can move along a threaded groove 10**.

Furthermore, the front end of said hammer 8 takes the form of two forward-protruding teeth **8*a* and 8*a* arranged symmetrically with respect to the shaft. The impact shaft 9 provided at the front end of said hammer 8 is fixed and supported at the front and rear on bearings 15*a* and 15*b* seated in case 1 in such a manner as to permit free rotation, while the two protruding teeth 9*d* provided at the front and rear of impact shaft 9 are arranged symmetrically with respect to the shaft. The protruding tooth 8*a* of said hammer 8 meshes with the protruding tooth 9*d* of impact shaft 9** with a gap left between them in the direction of rotation.

Moreover, as shown in FIG. 1(*a*), the front end of impact shaft 9 is fitted with a detachable bolt socket 18. This bolt socket 18 is interchangeable with the nut socket 24 shown in FIG. 1(*b*).

When the motor 2 rotates with the bolt socket 18 seated in bolt head, the hammer 8 will, as a result of this arrangement, be pushed forward, as shown in FIG. 2(*a*), as it follows the guide of bore 13 in the initial phase in which the spring force of spring 12 is greater than the torque of impact shaft 9, at which time the protruding tooth **8*a* of hammer 8 rotates while meshing with the protruding tooth 9*d* of impact shaft 9**.

As the bolt-tightening force gradually increases and the reaction force, pushing the impact shaft 9 up in the rearward direction, becomes greater than the spring force of spring 12, the hammer 8 will be pushed, as shown in FIG. 2 (*b*), in the rearward direction so that the protruding tooth **8*a* of hammer 8 comes out of mesh from the protruding tooth 9*d* of impact shaft 9. The hammer 8 is thus temporarily released from the load of impact shaft 9 but will bounce forward immediately afterwards under the action of the pushing force of spring 12**.

As a result, the protruding tooth **8*a* of hammer 8 and the protruding tooth 9*a* of impact shaft 9 will collide with each other in the next mating position (the condition of FIG. 2**(*a*)), thereby causing an impact force to be generated on impact shaft 9.

The following examples explain the various detectors provided in this system.

1) Impact sensor 31 (refer to FIGS. 1 and 2) The metal detecting impact sensor 31 for case 1 is installed in the proximal position at the rear end on the circumference of the outer cylinder **8*a* of hammer 8. This impact sensor 31 has a familiar proximity switch arranged so as to detect the presence of metal, by the relative spacing or distance from it, in such a manner that an OFF signal is generated when the hammer 8 mates with the impact shaft 9 (the condition of FIG. 2**(*a*)) and an ON signal is generated when the hammer 8 is pushed rearward and separated from the impact shaft 9 (condition of FIG. 2(*b*)).

Since the impact action of hammer 8 on the impact shaft 9 takes place immediately after the hammer 8 has separated from impact shaft 9, it will be possible to detect the occurrence of an impact on the impact sensor 31 as this impact sensor 31 generates an ON signal.

Figure 3A:
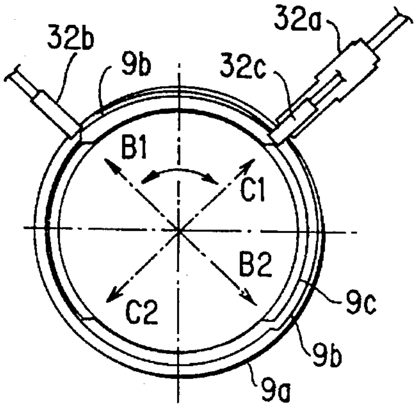
FIG. 3(*a*) is a view taken from the direction of line A—A of the angle sensor according to this Invention and FIGS. 3(*b*-1), 3(*b*-2) and 3(*b*-3) are waveform diagrams for the output voltage signals from the angle sensor of FIG. 3(*a*).
Figure 3A:
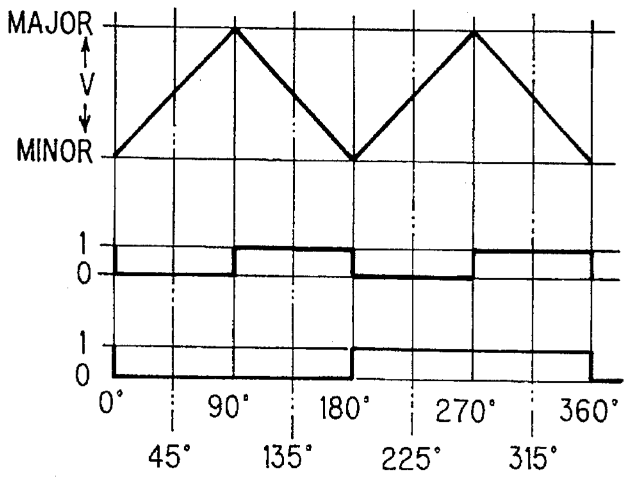

2) Angle sensor (refer to FIGS. 2 and 3)

First, second and third displacement tracks **9*a*, 9*b* and 9*c*, respectively, are successively created by displacing the respective outer diameters along the circumference at the rear end of the metal impact shaft 9. In addition, a displacement sensor 32*a* and the proximity switches 32*b* and 32*c* are arranged opposite the first, second, and third displacement tracks 9*a*, 9*b* and 9*c*, respectively, in case 1, so as to compose the angle sensor 32 for detecting the angle of rotation of the impact shaft 9 through a combination of these first, second, and third displacement tracks 9*a*, 9*b* and 9*c* and the displacement sensor 32*a* and proximity switches 32*b* and 32*c***.

Said displacement sensor **32*a* consists of a familiar overvoltage-type displacement sensor and is capable of measuring the outer-diameter displacement of the first displacement track by determining the relative distance from the outer circumference of the first displacement track 9*a* in terms of the change in the output voltage. The proximity switches 32*b* and 32*c* both function on the same principle as that of the displacement sensor 32*a*, with the difference, however, that the proximity switches generate ON/OFF signals according as to the relative distances from the second and third displacement tracks 9*b* and 9*c***.

As shown in FIG. 3(*a*), the circumference of the first displacement track **9*a* has an elliptical shape such that the diameter B1–B2 is somewhat larger than the diameter C1–C2 which intersects the former at right angles, so that said first displacement track 9*a* has a displacement contour with a periodicity of 180°. As a result, the output voltage measured by displacement sensor 32*a*, when the impact shaft 9 is rotating, exhibits a peak-and-valley output waveform with a periodicity of 180° as shown in FIG. 3**(*b*-1).

As shown in FIG. 3(*a*), the circumference of the second displacement track **9*b* is shaped in such a manner that the major axis (diameter) is the distance from B1 to B2 in clockwise rotation and the somewhat smaller minor axis (diameter) is the distance from B2 to B1 in clockwise rotation, with displacement to the major and minor axes taking place at a periodicity of 180°. The 180° detection signals obtained from the first proximity switch 32*b* measuring the circumference of the second displacement track 9*b* have a linear output waveform, with the straight line passing through "0" from 0° to 180° and through "1" from 180° to 360°, as shown in FIG. 3**(*b*-3).

Furthermore, as shown in FIG. 3(*a*), the circumference of the third displacement track **9*c* is shaped in such a manner that the minor axis (diameter) corresponds to the circumference segment from B1 to C1 in clockwise rotation and the segment from B2 to C2 in clockwise rotation, while the somewhat larger major axis (diameter) corresponds to the segment from C1 to B2 in clockwise rotation and the segment from C2 to B1 in clockwise rotation, so that the displacement from the major to the minor axis takes place at a periodicity of 90°. The 90° detection signals obtained from the second proximity switch 32*c* measuring the circumference of the third displacement track 9*c* have a linear output waveform, with the straight line passing through "0" from 0° to 90° through "1" from 90° to 180°, through "0" from 180° to 270°, and through "1" from 270° to 360°, as shown in FIG. 3**(*b*-2).

Over a full 360°, the peak-and-valley waveform of the first displacement track 9*a* with a periodicity of 180° exhibits its four identical output voltage values occurring every 90°. The combination of the second and third displacement tracks 9*b* and 9*c*, however, shows different combinations every 90° over a full 360° so that it is possible to determine the location to which the output value of the first displacement track 9*a* corresponds over the full 360° on the basis of the combination of the second and third displacement tracks 9*b* and 9*c*.

When, for example, the first displacement track 9*a* shows the intermediate value of the peak-and-valley waveform in FIG. 3(*b*-1), the angle of rotation corresponding to this intermediate value may be 45°, 135°, 225° or 315°. Yet, when the 180° detection signal obtained from the second displacement track 9*b* is "1" and the 90° detection signal obtained from the third displacement track 9*c* is "0," it follows from this combination that the output value can only be in the range from 180° to 270° so that it may be concluded that the output value of the first displacement track 9*a* is 225°.

Moreover, when the angle of rotation of the first displacement track 9*a* exceeds 360°, it is possible to determine the absolute value of the angle of rotation by adding 360° to the angle obtained from the combination of the second and third displacement tracks 9*b* and 9*c* appearing for and from the second time.

It is also possible to detect the torque of the impact shaft 9 with said angle sensor 32. When one impact is generated on impact shaft 9, it is possible to calculate the torque of impact shaft 9 by measuring, with angle sensor 32, the amount of advancement of the angle of rotation of the impact shaft 9 during the period from the generation of one ON signal by the impact sensor 31 to the next, making use of the fact that the amount of advancement of the angle of rotation of the impact shaft 9 is inversely proportional to the applied bolt-tightening force.

Figure 4C:
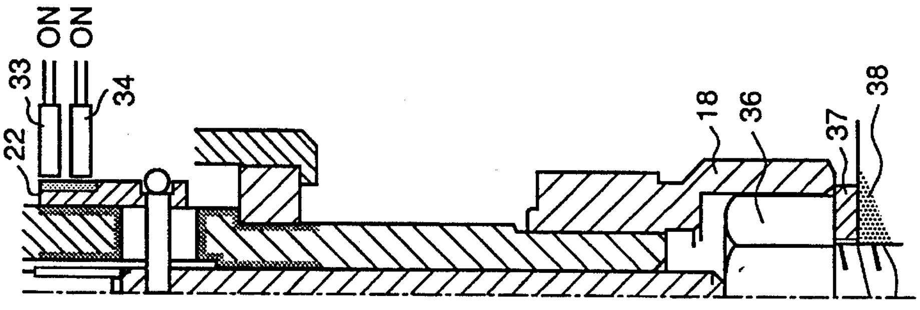
FIGS. 4(*a*) to (*c*) are section drawings designed to explain the shape sensor and socket sensor for the bolt socket of the impact wrench according to this Invention.
Figure 4B:
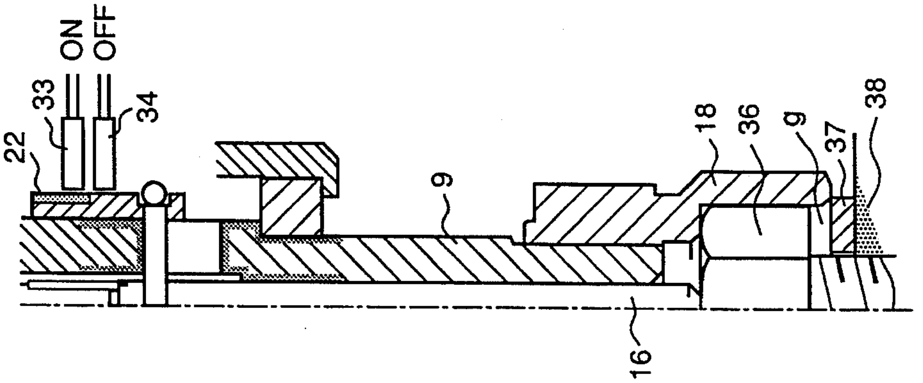
Figure 4A:
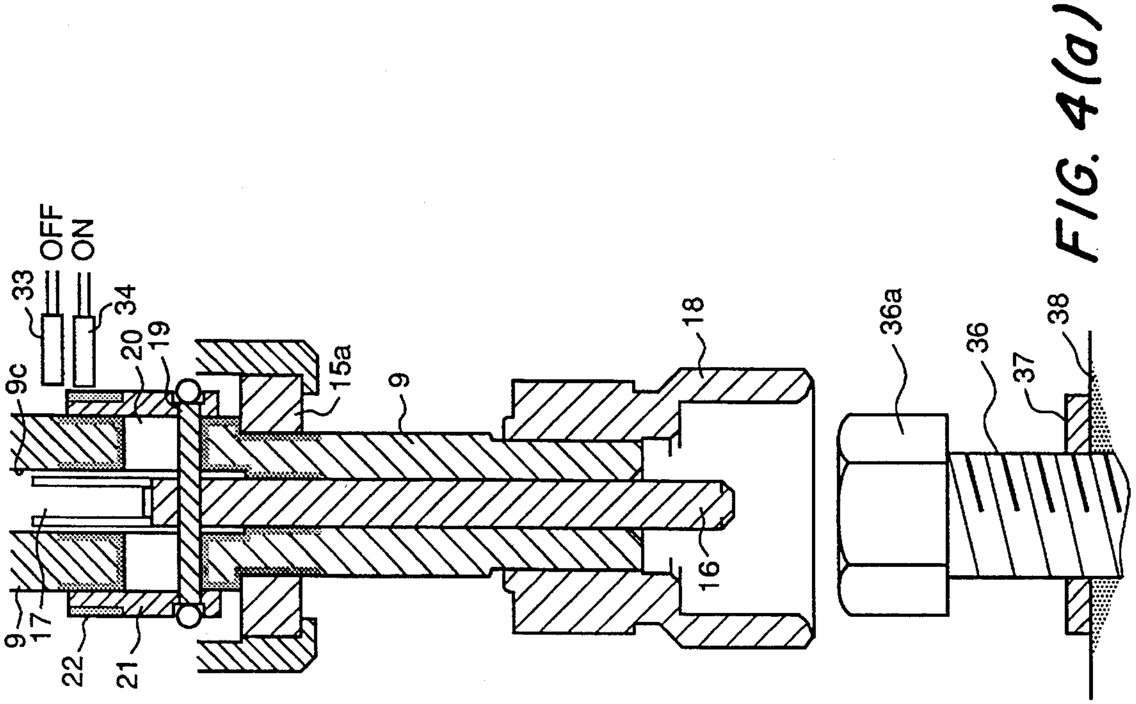

3) Socket sensor 33 and shape sensor 34 (refer to FIGS. 1 and 4)

The center of the impact shaft 9 has a through-hole 9*c*, and the sensor rod 16 has a sliding fit in said through-hole 9*c*. The rear-end of sensor rod 16 mates with protruding part 9*e* on the shaft of spindle 9 via a spring 17, so that force is applied to sensor rod 16 in the forward direction. The front end of the sensor rod 16 protrudes into bolt socket 18 from the end of the impact shaft 9. On impact shaft 9, a long hole 20 is provided so that the pin 19 inserted in sensor rod 16 is inserted into this long hole 20 while, at the same time, the two ends of pin 19 are fastened in sensor case 21. Said sensor case 21 is free to slide along the circumference of the impact shaft 9.

As a result, the sensor rod 16 can move in the horizontal (forward and rearward) direction only by the length dimension of said long hole 20, and the sensor case 21, following the movement of said sensor rod 16, is caused to slide in the forward and rearward directions on the circumference of the impact shaft 9.

The sensor case 21 is made of a synthetic resin material and a metallic sensor ring 22 is inserted at the rear on to the circumference of sensor case 21. Installed in the vicinity of the side of this sensor ring 22 is the socket sensor 33 on the rear end, and the shape sensor 34 on the front end, with respect to case 1. Said socket sensor 33 and shape sensor 34 are both metal detectors capable of detecting the presence of the metallic sensor ring 22 so as to detect the forward and rearward position of the sensor rod 16 according as to whether or not the sensor ring 22 is detected.

Thus, as shown in FIG. 4(*a*), in the condition prevailing prior to insertion of the bolt head 36*a* into socket 18, the sensor rod 16 is forced in the forward direction until the condition is reached when pin 19 makes contact with the lowermost end position of long hole 20, while the front end of sensor rod 16 protrudes into socket 18. In this condition, the socket sensor 33 is removed from its mating position with respect to sensor ring 22. Although it is in the OFF condition, the shape sensor 34 will make mating contact and be in the ON position.

As shown in FIG. 4(*b*), when the bolt head 36*a* is inserted into the socket 18. The front end of sensor rod 16 will contact said bolt head 36*a* and the pin 19 will be pushed, against the action of the spring force of spring 17, in the rearward direction until it reaches a position in which it makes contact with the uppermost part of the long hole 20. When, in this condition, the depth of socket 18 is larger than the height of bolt head 36*a*, a gap g will be created between the metal washer 37 and the bottom end of bolt head 36*a*. In this condition, socket sensor 33 makes contact with sensor ring 22 and is in the ON status, whereas the shape sensor 34 is removed from its contact position and goes to the OFF status.

In this manner, it is possible to detect whether the bolt head 36*a* is in the normal engagement condition inside socket 18 by way of detecting that the shape sensor 34 is in the ON status after the socket sensor 33 has acquired the ON status.

Furthermore, when socket 18 is rotated, the bolt 36 will drop inside the socket 18, as shown in FIG. 4(*c*), and the bottom end of bolt head 36*a* will make contact with metal washer 37 so that the gap g will disappear. In this condition, the sensor ring 22 will also drop as the sensor rod 16 descends, so that both the socket sensor 33 and the shape sensor 34 will make contact with said sensor ring 22 and thus go to the ON status, thereby making it possible to detect that the bolt head 36*a* is correctly seated on metal washer 37 above the tightening spring 38.

Figure 5C:
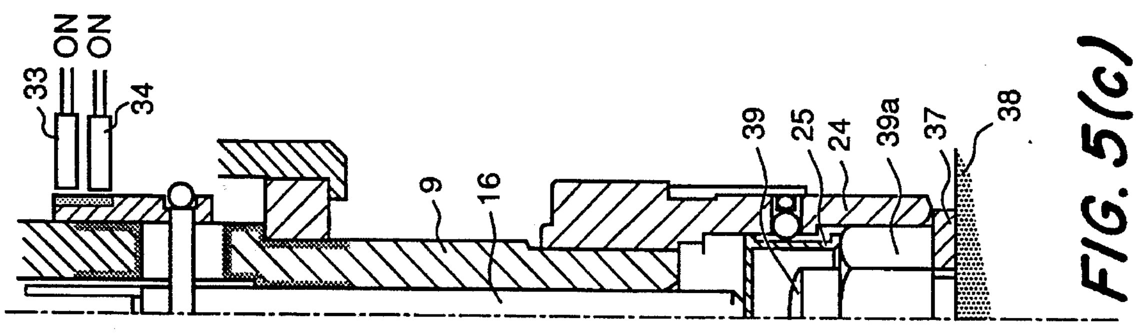
FIGS. 5(*a*) to (*c*) are section drawings designed to explain the shape sensor and socket sensor for the nut socket of the impact wrench according to this Invention.
Figure 5B:
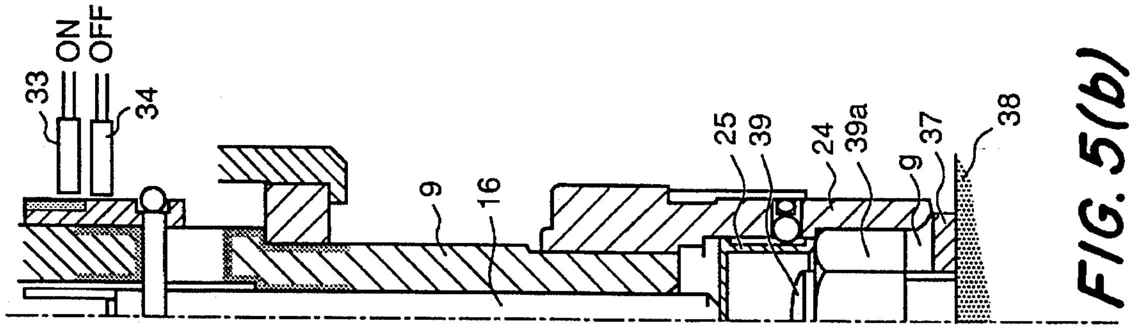
Figure 5A:
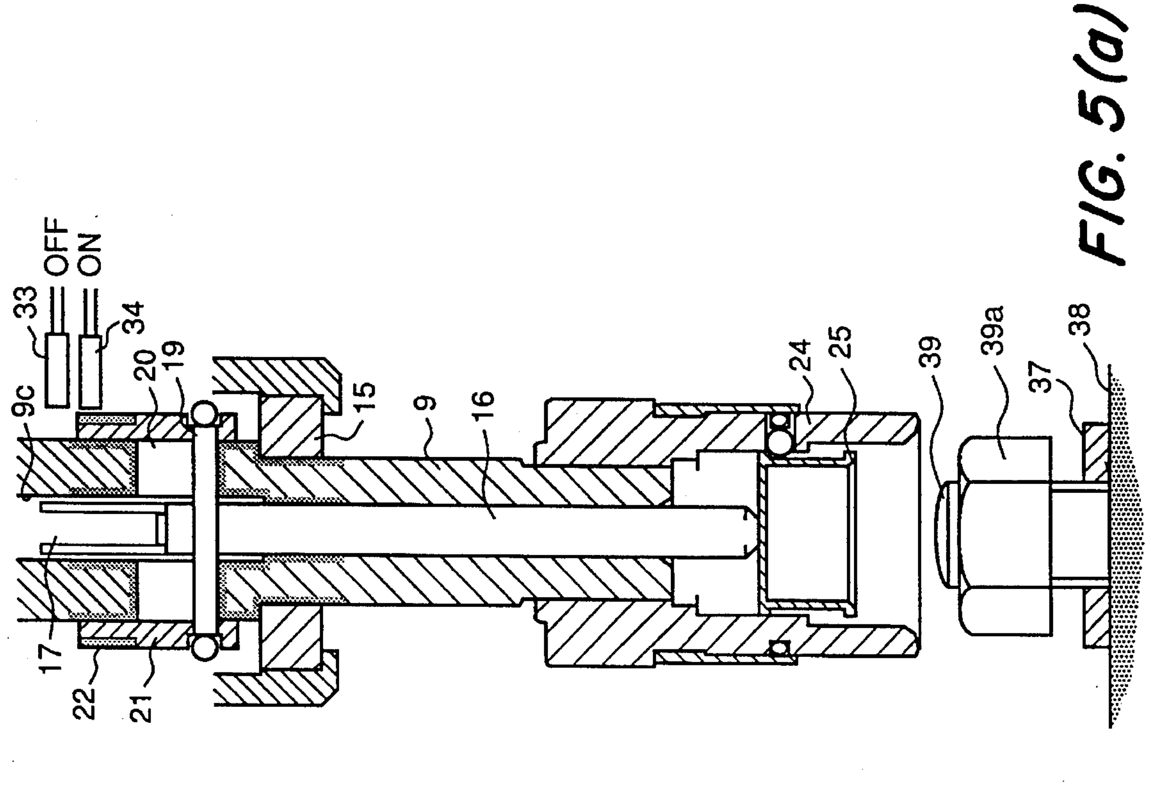

In the above arrangement, the bolt socket 18 provided at the front end of the impact shaft 9 can be replaced by the nut socket 24 shown in FIG. 1(*b*). As shown in FIG. 5, this is useful for tightening stud bolts 39 with a nut 39*a*.

If a bolt socket 18 is inserted with respect to a nut 39*a* in mesh with a stud bolt 39, the sensor rod 16 will not be capable of detecting any change in the tightening of nut 39*a* unless its contact position with stud bolt 39 changes. To permit detection by means of said sensor rod 16, the nut socket 24 is formed by insertion of the cup-shaped nut case 25 in the socket arranged so that its bottom surface makes contact with sensor rod 16.

As shown in FIG. 5(*b*), this type of nut socket 24 permit free extension of the stud bolt 39 in the interior of nut case 25 when the top end of nut 39*a* has contacted the bottom circumference of nut case 25. As a result, it is possible, as shown in FIGS. 5(*a*) to (*c*) using the same action as that explained above for the bolt socket 18, to detect by means of socket sensor 33 and shape sensor 34 that the nut 39*a* has been tightened, also when a stud bolt 39 is used.

4) Bolt Extraction Height Sensor 35 (refer to FIGS. 6 and 7)

FIGS. 6 and 7 show a system with an built-in array of two of the above impact wrenches 45. The trolley frame 42 is equipped with wheels 41 and 41 at the front and rear so that it can be positioned on a track rail 40. The trolley frame 42 is equipped with freely oscillating slide rails 43 and 43 independently positioned on either side of the rail 40 on which the trolley frame 42 moves. Each of these slide rails 43 and 43 is provided at the top with a wind-up type plate spring 44 and 44 for weight balancing. Guide plates 43*a* and 43*a* projecting into the sides of each of the impact wrenches 45 and 45 are slidably inserted in slide rails 43 and 43. The bottom ends of said plate springs 44 and 44 are fastened on to these guide plates 43*a* and 43*a*, respectively.

By this means, each of the two impact wrenches 45 and 45 will maintain their floating balance independently suspended on plate springs 44 and 44, so that they can easily be moved up and down by operating the handle 47. It is also possible to alter their front-rear and left-right positions with respect to the bolt 36 to be tightened.

In addition, the impact wrenches 45 and 45 are laterally equipped with a metal detector type bolt extraction height sensor 35. A vertically movable metal plate 46 is laterally mounted on the slide rails 43 and 43.

Figure 8A:
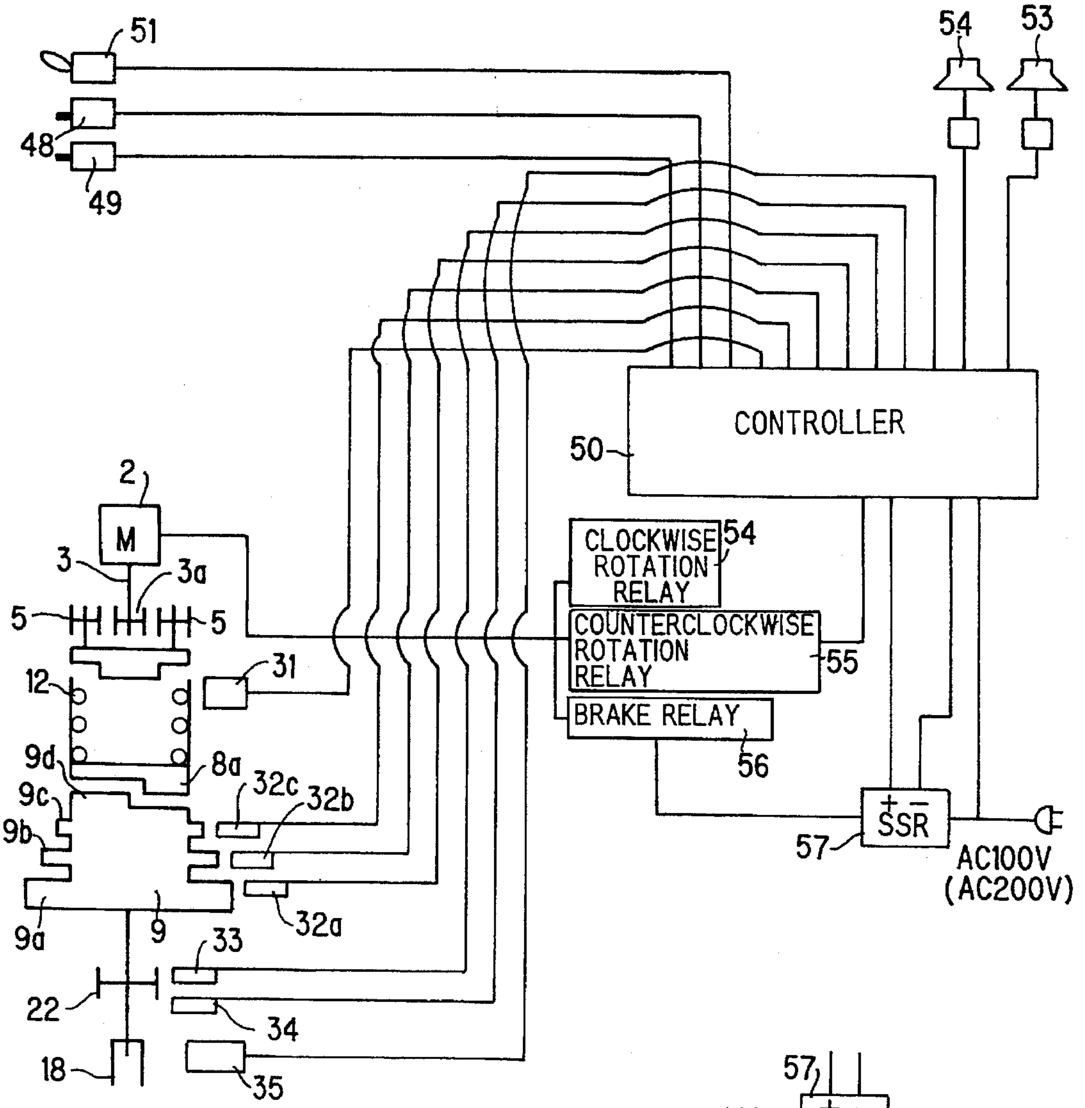
FIG. 8(*a*) is a circuit diagram of the impact wrench according to this Invention, and FIG. 8(*b*) is a circuit diagram of the brake circuit of the impact wrench according to this Invention.
Figure 8B:
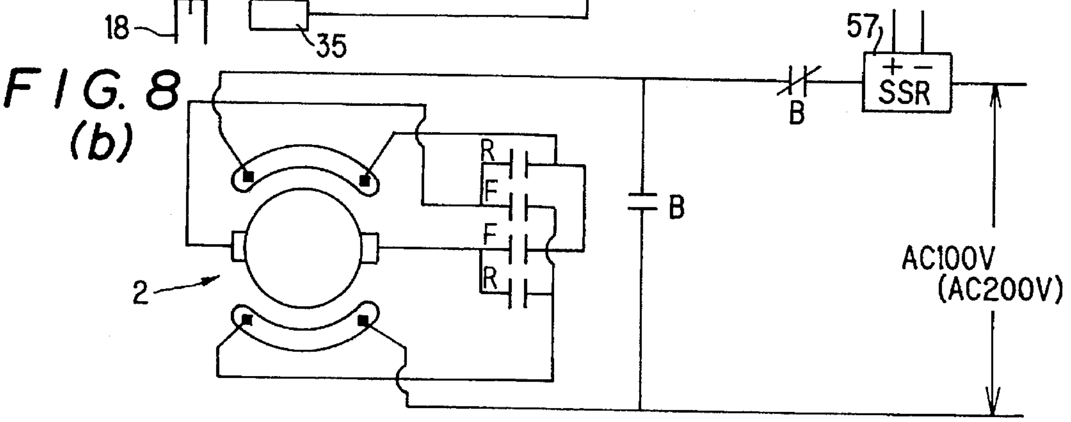

The grip of said handle 47 is equipped with a limit switch 48 for clockwise rotation and a limit switch 49 for counterclockwise rotation, while the top part of the impact wrench has a controller 50 with an Auto/Manual select switch 51, a rotation angle setting knob 52 and a torque sitting knob 53 (see FIG. 8).

When the bolt 36 of the rail tightening device is slackened to extract it completely or slacken it only a little, the bolt may come out totally or its height of extraction may not be aligned, seeing that it is not possible to control the extraction height with the manual switch because of the rough screw pitch of bolt 36.

As a result, provision is made to permit the automatic adjustment of the bolt's extraction height by using, in the above construction, a bolt extraction height sensor 35 and the brake circuit of motor 2.

Thus, the metal plate 46 along slide rail 43 can be adjusted by moving it up or down in such a manner as to previously select the height of the metal plate 46 in accordance with the desired bolt extraction height so that when the bolt extraction height is to be set to a small amount (as shown in h1 of FIG. 6(*b*)), this metal plate 46 is located in the lower position, and, conversely, when the bolt extraction height is to be set to a large amount (as in h2 of FIG. 6(*c*)) this metal plate 46 is located in the upper position.

In this manner, the bolt extraction height sensor 35 will be in the OFF condition without detecting the metal plate 46 while the bolt tightening process shown in FIG. 6(*a*) is in progress. As shown in FIGS. 6(*b*) or 6(*c*), however, when the tightened bolt 36 is pushed upwards under the slackening action on tightened bolt 36, the bolt extraction height sensor 35 will go to the ON status on detection of the metal plate 46 in accordance with the desired bolt extract height. The power supply to motor 2 will be interrupted in this condition, with the rotation of said motor 2 being stopped through the brake circuit described below so that the desired bolt extraction height can be achieved automatically.

The following explanations refer to the above impact wrench and sensor circuit layouts as shown in FIG. 8(*a*).

Apart from the Auto/Manual select switch 51 and the limit switches 48 and 49 for clockwise and counterclockwise rotation, the controller 50 also features a rotation angle setting knob 52 and a torque setting knob 53 as well as the above sensors, that is, the impact sensor 31, the angle sensor 32 (the first, second and third displacement sensors 32*a* and the proximity switches 32*b* and 32*c*), the socket sensor 33, the shape sensor 34, and the bolt extraction height sensor 35, all of which are designed to permit input.

The output from controller 50 is applied to the electric motor 2 through the clockwise rotation relay 54, the counterclockwise rotation relay 55 and the brake relay 56, while the SSR (solid state relay) 57, receiving the commands from controller 50, is connected with the clockwise rotation relay 54, the counterclockwise rotation relay 55 and the brake relay 56 so that the intermittent ON/OFF action (inching) of SSR 57 is controlled by the ON status of the relays 54, 55, and 56.

As shown in FIG. 8(*b*), the clockwise and counterclockwise rotation circuits and the brake circuit for the electric motor 2 are designed so that the brake relay (B) for the single-phase series-wound collector electro-motor 2 is operated in the ON condition of the clockwise rotation relay (R) or the counterclockwise rotation relay (F).

The operating procedure for the bolt tightening process using the impact wrench of the constructions described above will be explained by referring to the charts of FIGS. 9 and 10.

Figure 9:
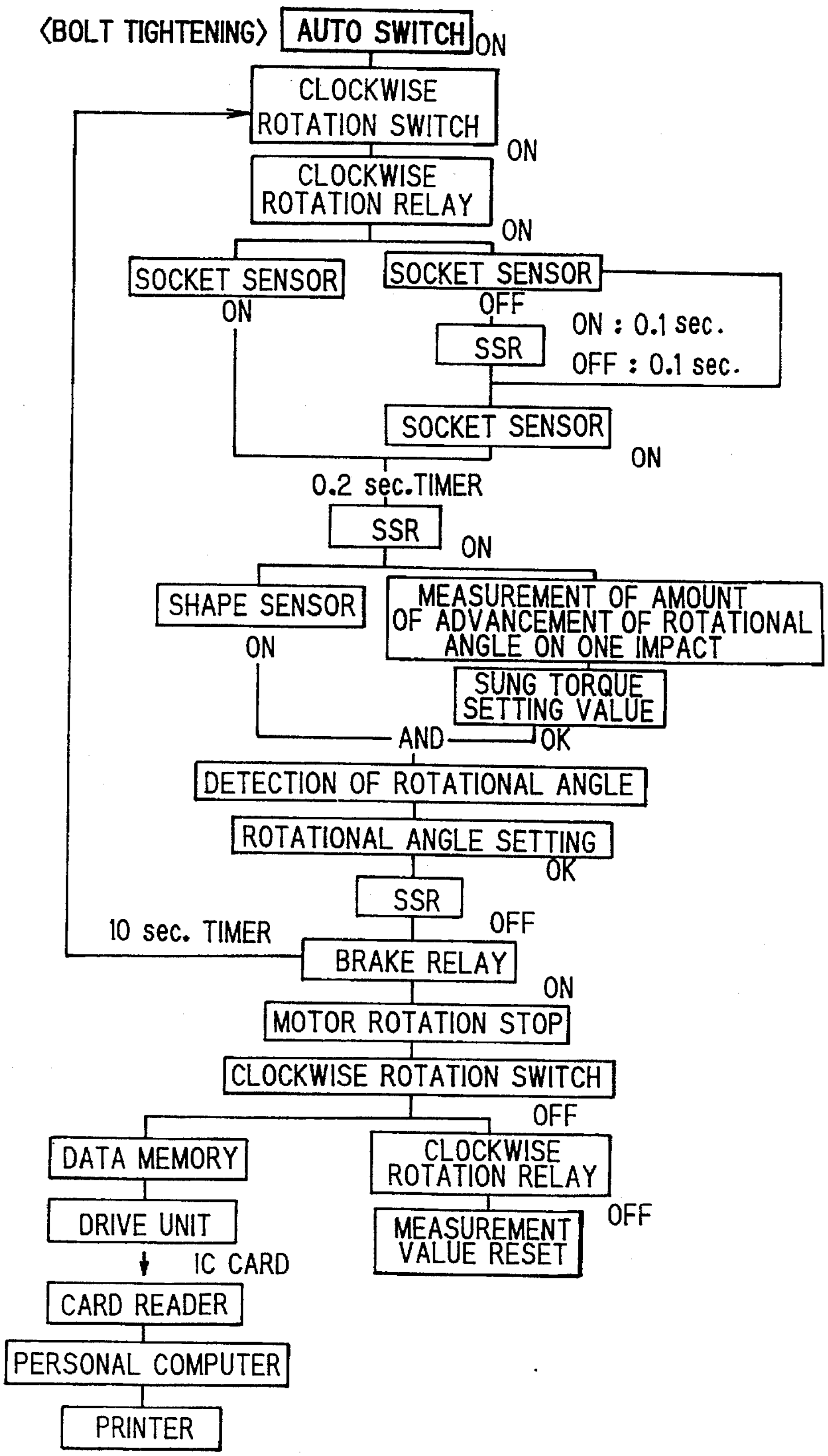
FIG. 9 is a chart showing the bolt-tightening operation of the impact wrench according to this Invention.
Figure 10:
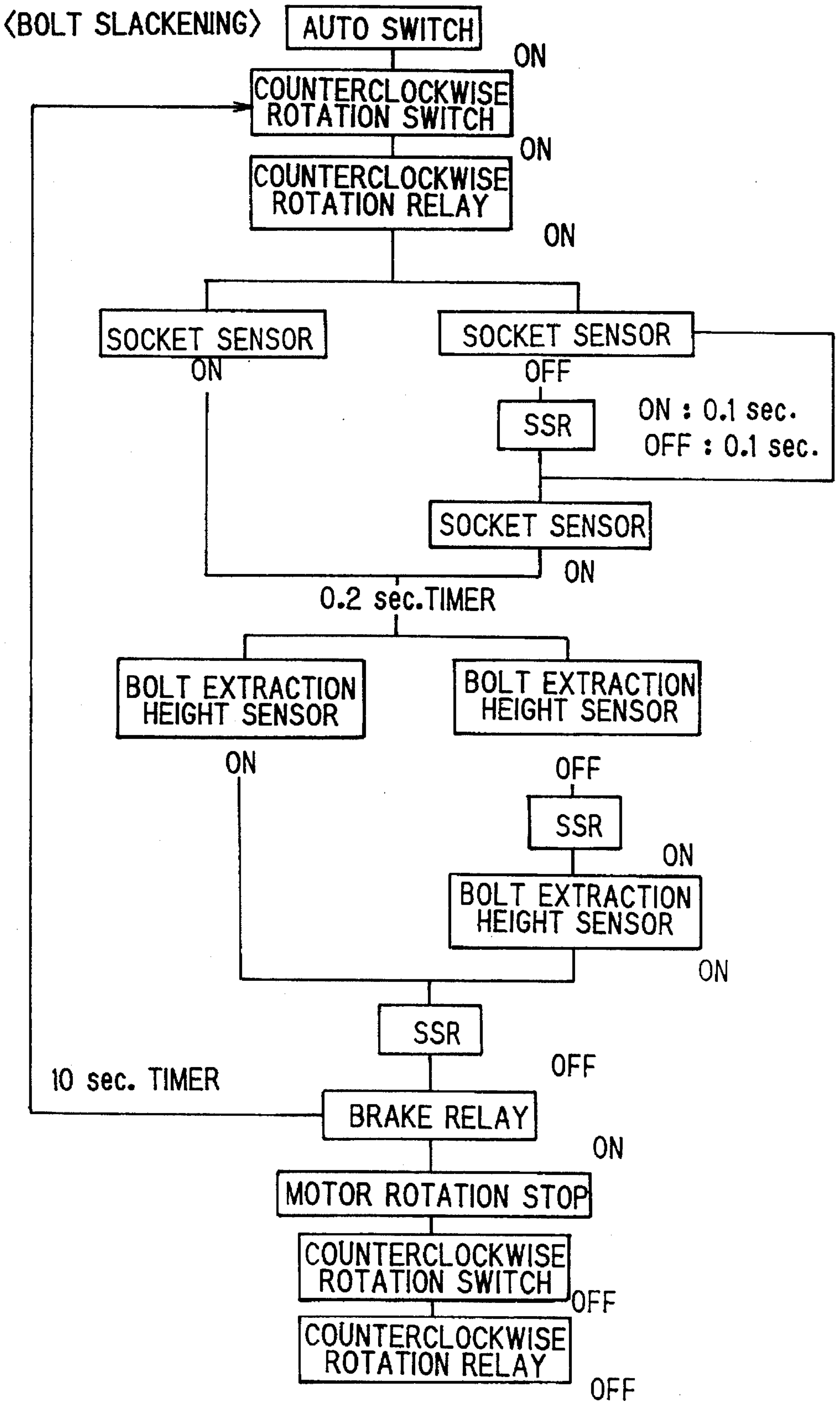
FIG. 10 is a chart showing the bolt-slackening operation of the impact wrench according to this invention.

As shown in FIG. 9, the rotational angle setting has been preset with the rotation angle setting knob 52, and the snug torque setting has been made using torque setting knob 53.

The socket 18 is now inserted into the head 36*a* of the bolt 36 to be tightened, and the auto switch 51 is turned to ON so that when the clockwise rotation limit switch 48 (hereinafter called clockwise rotation switch) is turned ON, the clockwise rotation relay 54 is in the ON status.

When the socket 18 is properly engaged in bolt head 36*a*, the socket sensor 33 goes to ON and the operation sequence moves to the next stage. If, however, the socket 18 is not positively engaged in bolt head 36*a*, the socket sensor 33 will switch to OFF and the SSR relay 57 will control the electric motor 2 in such as manner as to cause repeated start/stop operation (inching) consisting of 0.1 second rotation and 1.0 second stop, with respect to the socket 18. When the socket 18 is eventually correctly engaged in bolt head 36*a*, the socket sensor 33 will go to ON.

The next step is to delay rotation by 0.2 seconds using a timer. This means that after the socket 18 has been correctly engaged in the head of bolt 36, there will be a blank of 0.2 second until the head of said bolt 36 is completely home in the interior of socket 18.

Following this, the SSR relay 57 goes to ON and rotation is started under the action of motor 2. In this condition, the shape sensor 34 will detect that the head of said bolt 36 is seated on the upper surface of tightening spring 38.

However, the impact sensor 31 will detect that an impact has occurred on impact shaft 9 by detecting the floating condition of hammer 8. From this moment, the angle sensor 32 will measure the amount of advancement of the rotational angle of the impact shaft 9 each time an impact occurs, and the advance in the angle of rotation of the impact shaft will be detected from the time at which the former value has reached the predetermined snug torque value.

At the time at which the amount of advancement of the angle of rotation of impact shaft 9 has reached the previously set rotational angle value, the SSR 57 will go to OFF and the brake relay 56 will be active.

In this condition, the clockwise rotation switch 48 is timed to remain inactive for 10 seconds, although it is in the ON condition, so as prevent its repeat action which would occur as this clockwise rotation switch 48 remains in the ON status.

After rotation of the motor 2 has been stopped under the action of said brake relay 56, the rotational angle measuring value will then be reset when the clockwise rotation switch 54 is stopped.

As shown in FIG. 9, the system is designed so that data processing takes place as shown in the figure when the clockwise rotation switch 48 is in the OFF status. This is achieved through control status data processing for controller 50 and makes it possible to record the tightened status for each and all bolts using, for example, a familiar IC card.

When bolts are slackened, the metal plate 35 for the bolt extraction height sensor 35 is previously set to a height corresponding to the desired bolt extraction height.

When the socket 18 is not inserted into the head of the bolt 36 to be tightened and the AUTO switch 51 is in the ON status and the counterclockwise limit switch (hereinafter called reverse switch) 49 is then switched ON, the counterclockwise rotation relay 55 will go to ON.

The detection operation of socket sensor 33 in the next stage will be to detect whether or not the socket 18 has been correctly located on the head of bolt 36 in the case of bolt extraction, This is similar to the case shown in FIG. 9.

After the socket 18 has been correctly located on the head of bolt 36, the bolt head *36a* is allowed to reach its fully home position in the socket 18 by delaying rotation for 0.2 seconds using a timer so that when the bolt extraction height sensor 35 is in the OFF status, SSR 57 goes to ON. Conversely, when the bolt extraction height sensor 35 is in the ON status, SSR 57 goes to OFF, resulting in the brake relay 56 being active. In this condition, a 10 second timer is operated as above so that when the reverse switch 54 is interrupted after rotation of motor 2 has been stopped, the counterclockwise rotation relay goes to OFF, As explained above, the bolt-tightening method using the impact wrench according to this invention is devised so that the tightening reaction force is detected for each bolt actually being tightened by measuring the amount of advancement of the angle of rotation associated with any one impact after impact has been generated while the snug torque has been generated, and the time at which this amount of advancement of the rotational angle has reached the preset snug torque (snug torque setting) is taken as the starting point for the commencement of measurement of the angle of rotation of the impact shaft. The electric motor is stopped at the time at which this preset rotational angle has reached the predetermined amount of advancement of the rotational angle (present rotational angle advance).

As a result, the snug torque setting can be varied in this bolt-tightening method so that it is possible to make the settings in accordance with, and to suit, the bolt-tightening environment without using the impact generating period which may vary according to various factors as the snug bolt setting, as has been the case in the conventional bolt tightening methods consisting of rotational angle and torque methods.

Moreover, the angle sensor is a contact-free sensing device with respect to any of the objects measured so that it is not influenced by the thrust force of the impact shaft and thus permits measurement results of high accuracy.

In accordance with the above invention, it is thus possible to achieve automatic bolt-tightening operation under the specified bolt-tightening force without relying on the sense or skill of the operator so that even an inexperienced operator can perform correct bolt-tightening operation without giving rise to variations in the bolt-tightening force.

What is claimed is:

1. A bolt-tightening method using an impact wrench comprising the steps of:

providing an impact wrench including an electric motor cooperating with a braking circuit, a spindle rotatably connected to said electric motor by an output shaft, a spring-biased, rotatable, hammer mounted about an outer circumference of said spindle, a rotatable impact shaft engageable with said hammer, a socket fixed to a front end of said impact shaft, an impact sensor for detecting an impact of said hammer with said impact shaft, and an angle sensor for measuring the angle of rotation of said impact shaft during bolt tightening;

applying a spring force, through the outer circumference of said spindle coupled with the output shaft of the electric motor, in a forward direction to the hammer which is capable of forward movement, rearward movement and rotational motion following said spindle;

bringing said hammer and said impact shaft into coaxial coupling so as to allow rotational and axial relative movement between said hammer and said impact shaft;

inserting a bolt to be tightened into said socket and starting said electric motor so as to tighten said bolt into a fixed subject;

allowing axial movement of said hammer so as to disconnect the coupling between said hammer and said impact shaft when said impact shaft receives a predetermined snug torque from said bolt;

bringing said hammer again into coaxial coupling with said impact shaft under a spring bias in the forward direction so as to apply an impact force to said impact shaft in a direction of tightening said bolt;

detecting disconnection of coupling between said hammer and said impact shaft with said impact sensor and an angle of rotation of said impact shaft with said angle sensor;

measuring torque of said impact shaft by measuring an amount by which the angle of rotation of said impact shaft advances each time said impact force is generated and an amount by which the angle of rotation of said impact shaft advances since measured torque has reached a previously set snug torque value; and disconnecting a power supply to said electric motor when advancement of the rotational angle from a point at which said predetermined snug torque reaches a predefined value of a preset angle of rotation to stop rotation of said impact shaft through said braking circuit.

* * * * *